(12) United States Patent
Monson et al.

(10) Patent No.: US 6,902,329 B2
(45) Date of Patent: Jun. 7, 2005

(54) METHOD AND APPARATUS FOR THE INTEGRATION OF PARALLEL OPTICAL TRANSCEIVER PACKAGE

(75) Inventors: Robert J. Monson, St. Paul, MN (US); Jianhua Yan, Prior Lake, MN (US)

(73) Assignee: Lockheed Martin Corporation, St. Paul, MN (US)

( * ) Notice: Subject to any disclaimer, the term of this patent is extended or adjusted under 35 U.S.C. 154(b) by 127 days.

(21) Appl. No.: 10/365,341

(22) Filed: Feb. 12, 2003

(65) Prior Publication Data

US 2004/0156594 A1 Aug. 12, 2004

(51) Int. Cl.[7] .................................................. G02B 6/36
(52) U.S. Cl. .......................................... 385/88; 33/279
(58) Field of Search ........................ 385/88–92; 33/227, 33/279

(56) References Cited

U.S. PATENT DOCUMENTS

| | | | |
|---|---|---|---|
| 4,823,470 A | * | 4/1989 | Horvallius .................... 33/228 |
| 4,973,158 A | * | 11/1990 | Marsh .......................... 356/247 |
| 5,042,890 A | | 8/1991 | Wehrle et al. |
| 5,149,937 A | * | 9/1992 | Babel et al. ............ 219/121.68 |
| 5,337,392 A | | 8/1994 | Mousseaux et al. |
| 5,584,458 A | * | 12/1996 | Rando ..................... 248/231.41 |
| 5,859,947 A | | 1/1999 | Kiryuscheva et al. |
| 6,012,229 A | * | 1/2000 | Shiao ........................... 33/365 |
| 6,052,911 A | * | 4/2000 | Davis ........................... 33/286 |
| 6,190,056 B1 | | 2/2001 | Kwon et al. |
| 6,242,274 B1 | | 6/2001 | Nyholm |
| 6,342,946 B1 | * | 1/2002 | Holstein ................... 356/152.1 |
| 6,396,796 B1 | * | 5/2002 | Kletzl .......................... 720/615 |
| 6,439,780 B1 | | 8/2002 | Mudd et al. |
| 6,454,468 B1 | | 9/2002 | Yoon et al. |
| 6,457,873 B1 | | 10/2002 | Heier et al. |
| 6,498,892 B1 | | 12/2002 | Harman |
| 6,511,236 B1 | | 1/2003 | Webjorn et al. |
| 6,516,130 B1 | | 2/2003 | Jang |
| 6,565,266 B2 | | 5/2003 | Mun et al. |
| 6,571,041 B2 | | 5/2003 | Bourcier et al. |
| 6,651,591 B1 | * | 11/2003 | Chelen ........................ 119/707 |
| 2002/0168168 A1 | | 11/2002 | Iravani |

FOREIGN PATENT DOCUMENTS

GB 2131971 A 6/1984

* cited by examiner

*Primary Examiner*—Ellen E. Kim
(74) *Attorney, Agent, or Firm*—Patterson, Thuente, Skaar & Christensen, P.A.

(57) ABSTRACT

A tool and method for the alignment and placement of optoelectronic devices with attached fiber optic connectors onto the electronic interface substrate of a parallel optical transceiver package. The optoelectronic devices are connected to the substrate through a flexible circuit. The tool is comprised of a mounting frame, which includes a recess for the parallel optical transceiver package, and a rotatable clamp assembly for positioning a pair of optoelectronic devices with attached fiber optic connector and flexible circuit. Rotation of the rotatable clamp assembly properly places the flexible circuit onto the attachment point of the substrate. The rotating clamp assembly is then fixed in place by securing the actuator arm to the mounting frame. Once the clamp is secured, the flexible circuit is bonded to the substrate.

13 Claims, 8 Drawing Sheets

METHOD AND APPARATUS FOR THE INTEGRATION OF PARALLEL OPTICAL TRANSCEIVER PACKAGE

FIELD OF THE INVENTION

The present invention relates to a method for the integration of a parallel optical transceiver package and more particularly to positioning an array of optoelectronic devices onto the electronic interface substrate of the package and maintaining relative position of the two components for application of adhesive and subsequent curing. The invention further relates to an assembly tool for the above described method utilizing a multi-piece fixture which aligns the optoelectronic device and guides it through the necessary rotation for connection to the electronic interface substrate and then is locked so as to maintain relative position of the components thereafter until bonding is complete.

BACKGROUND OF THE INVENTION

There is a need for high-speed cost effective optical transmitters which can operate as parallel optical communications data links. The preferred method of transmission for voice and data information across a network is by optical fiber due to bandwidth capacity and lower signal attenuation as compared to traditional copper networks. The light emitting and light receiving devices are referred to as optoelectronic devices and they are generally coupled at a first end to one or more fiber cables. The optical fibers provide the path for photons created by an optoelectronic device, such as a semiconductor LED or laser. An opposing end of the fiber cable is connected to a light-receiving device such as a photo detector.

The primary function of the optical transmitter is to translate electrical signals into optical signals. The optical transmitter interfaces with an electric interface circuit for driving the light transmitting device. A parallel optoelectronic module or package may include both receiver and transmitter functions.

The coupling of an optoelectronic device with an array of optical fibers at a first end and an interconnecting substrate at the opposing end is a difficult task for every time a coupling is made the quality of the signal transmission is affected. In a typical coupling, an optical connector is employed for efficiently managing the transfer of photons from the light-emitting device to the fiber optic cable. The optical connector must be aligned and connected with the optoelectronic device. The coupling of such systems generally require precise alignment for signal quality decreases with increased distances from an optical port to an optical connector unless the photons are properly directed into the fiber cable. The alignment techniques necessary to achieve such precise alignment are typically performed manually which is both time consuming and expensive.

Optical connections are only half the battle of effective coupling. Connection of the optoelectronic device with the electronic interface substrate of the package is complicated due to geometric constraints. The optoelectronic transmitter commonly used in fiber optic networks is the vertical cavity surface emitting laser (VCSEL). Unfortunately, the VCSEL emits light in a generally perpendicular direction to the plane of the fibers and substrate therefore making stacking of such components difficult. To solve the packaging problem the VCSEL is either mounted parallel to the substrate and the output photons directed 90° through mirrors or the VCSEL is mounted perpendicular to the substrate and the electrical interface connectors bent 90°. The optical bending solution is less than optimal due to the difficult optical design and alignment required. Conversely, the bending of electrical conductors is well known in the art through implementation of flexible circuits. Therefore, flexible electrical circuits capable of achieving the necessary 90° bend are the generally accepted solution.

In order to reduce electrical parasitics, short electronic interconnects are needed between the optoelectronic device and the electronic interface circuitry. The problem alignment and bending of the flexible circuit are exacerbated as data rates of the optoelectronic devices increase, closer connections must be established in order to maintain electrical performance levels. The placement and bending of the flexible circuit on the substrate is typically performed manually by a skilled technician just prior tot application of an adhesive. Unfortunately, the existing techniques employed in connection with this process are time consuming, expensive and prone to failure due to misalignment. If the placement of the flexible circuit fails to align with the substrate connectors, the entire component may need to be scrapped. While manual bending and aligning techniques exist for mounting an optoelectronic device to the substrate, it would be desirable to improve the efficiency and reduce the cost of the coupling.

SUMMARY OF THE INVENTION

The present invention is a method and integration tool for the dual alignment and placement of optoelectronic devices on the electronic interface substrate of a parallel optical transceiver package. The tool is comprised of a rotatable clamp assembly disposed on a mounting platform. The optoelectronic devices are connected to the substrate through a flexible circuit disposed adjacent to optical connector and light-emitting device. The rotatable clamp assembly positions the optoelectronic devices with the flexible circuit suspended above the appropriate recess in the package substrate. Rotation of an actuator arm connected to the rotatable clamp assembly places the flexible circuit onto the substrate. The rotating clamp assembly is then fixed in place by securing the actuator arm to the mounting frame. Properly aligned systems are fixed by applying adhesive. The completed unit is preferably constructed of a metal such as aluminum to facilitate the curing process, which may require elevated temperatures.

The present invention provides a cost efficient method of aligning and connecting optoelectronic devices to the electronic interface circuitry of the package. It is essential that the exact alignment of the light source or laser diode portion and light-receiving portion be maintained throughout the assembly process. The present invention enables repeatable and consistent rotation of a flexible circuit 90° so as to connect with a substrate for the parallel packaging of the electronic interface circuitry with the light source. The method maintains the integrity of the optical connection while reducing the time intensive manual component of assembly. Furthermore, the mechanical aspect of the process provides a reliable means of duplicating successful placement thus increasing the output of properly aligned assemblies.

In a preferred embodiment, the optoelectronic devices are VCSEL arrays to which a flexible circuit is attached. The flexible circuit contains electrical traces on one side which provide current pathways to the VCSEL from the integrated circuits of the package. A passive alignment guide in the form of a spacer block is mounted distally from the VCSEL on the opposing side of the flexible circuit. A recess disposed in the substrate is sized to accept the mating of the spacer block. Upon rotation, the electrical traces of the flexible circuit are disposed at the same level as the substrate traces so as to minimize lead distances.

The rotating base of the clamp assembly is initially disposed transverse to the package. The optical connector with VCSEL array positioned on the top is disposed within the appropriate cavity in the rotating base unit. The laser clamp mates with the rotating base over the VCSEL so that VCSEL and optical connector are disposed generally transverse to the package. The distal end of the flexible circuit freely extends parallel to the package. Preferably, the rotating clamp assembly pivots by manually raising the actuator arm from a resting position until contact is made with the upper mounting frame. The rotation places the spacer block in the recess of the substrate as the flexible circuit bends approximately 90°. Adhesive can then be applied to form a permanent bond between spacer block and the electronic interface substrate.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances, well-known methods, procedures, components and circuits have not been described in detail so as to not to unnecessarily obscure aspects of the present invention.

The present invention is a tool and method for the integration of an optoelectronic device with a fiber optic connector to a parallel optical transceiver package. Fiber optic transmitter and receiver electrical elements are implemented on two separate substantially parallel boards. The boards are disposed substantially perpendicular to the base of the optoelectronic device. A flexible circuit is bent 90° in order to join the optoelectronic device to the electrical circuitry of the parallel optical package.

In the preferred embodiment, the present invention is used for the integration of a vertical cavity surface emitting laser (VCSEL) within a parallel optical package. In this geometric configuration, light emitted from the surface of the VCSEL laser is oriented nominally along a plane parallel to the substrate. This is the preferred direction for the optical portion of the package because the optical cable can then extend parallel to the substrate thus allowing multiple packages to be stacked.

A flexible circuit, bent at a right angle is used to electrically connect pads on the substrate to pads on the optoelectronic dyes, which are oriented perpendicular to the substrate. The flexible circuit has leads defined in one single layer protected by a sheet of insulating material. At one end of the flexible circuit, bonds are used for the connection to the optoelectronic dyes. At the other end an array of large pads provides landing sites for testing. After the flexible circuit is secured in its aligned position in the cavity of the substrate, each of its leads are electrically connected to corresponding pads on the substrate by a series of wire bonds.

Accurately aligning the bonding sites on the substrate to the flexible circuit is a challenging step. Too great an offset between bonding sites can effect wire bond yields and process time and create a high inductance electrical sub system, due to the longer wires and higher wire loops required to accommodate a large lateral offset. The offset of the flexible circuit and the substrate bonding site is a result of cumulative placement errors between flexible circuit and optoelectronic device, optoelectronic device and optical coupler, optical coupler to fiber optics. These attachment steps along with the right angle bending of the flexible circuit when the optical assembly is mounted onto the substrate could result in unacceptably large angular and position placement errors. However, these placement errors can be kept to a minimum through the careful design and assembly of component parts. It should be noted that placement errors can impact the amount of noise introduced into the system, possibly making the system not functional.

Figure 1:
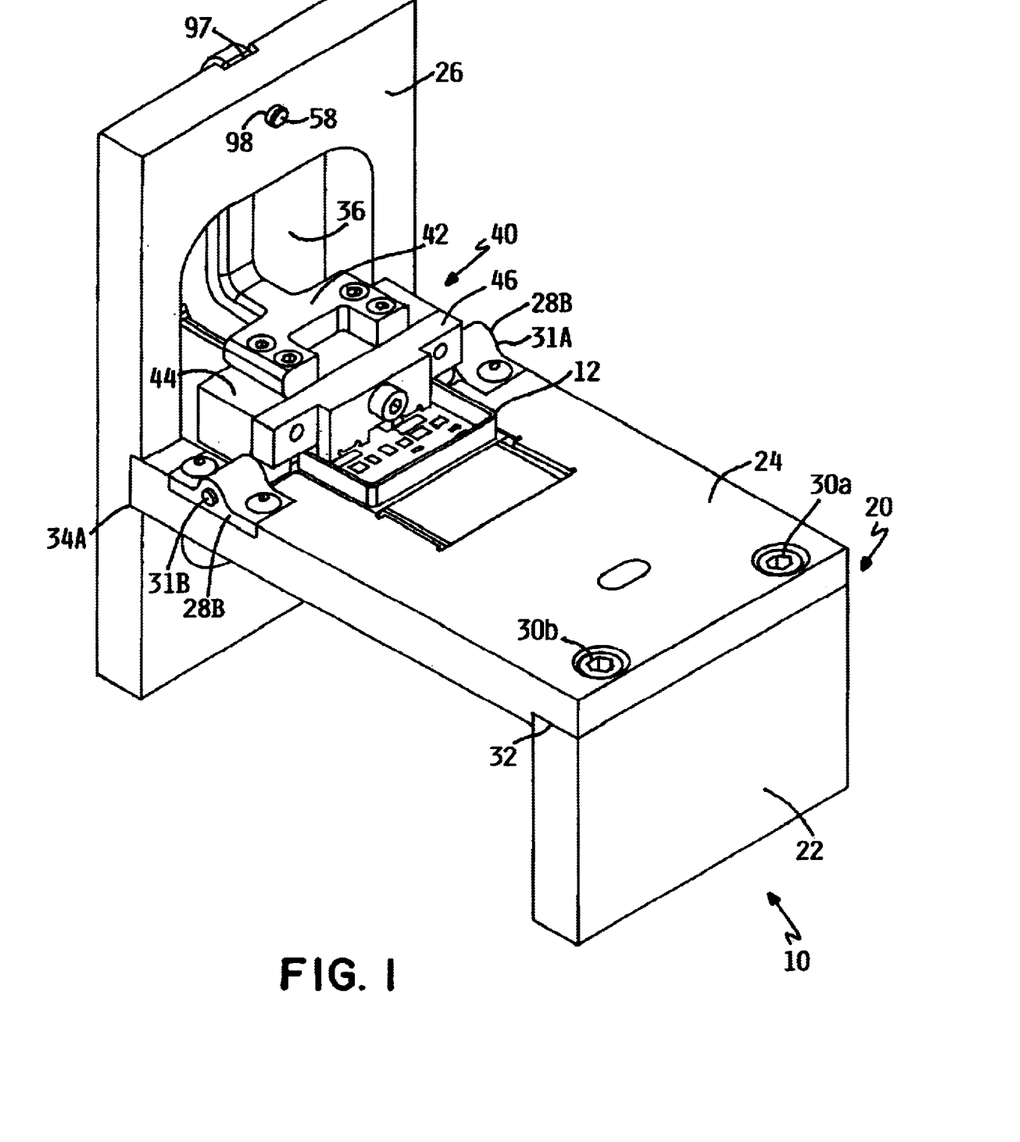
FIG. 1 is a perspective view of a laser package integration tool with a parallel optical package in place.

A laser package integration tool 10, in accordance with the present invention, is constructed as shown in FIGS. 1–5. FIG. 1 is a perspective view of the laser package integration tool 10 which provides for alignment of the optoelectronic device with a parallel optical transceiver package 12. The optoelectronic device 10 is comprised of a vertical cavity surface emitting laser (VCSEL) 14, the active face of which is mounted on a flexible circuit 16 and then aligned with an optical connector 15. Fiber optic cables 18 mated to the connecter 15 complete the circuit. The laser package integration tool 10 is comprised of a package support frame 20 and a laser insertion assembly 40.

The package support frame 20 provides a work stand for placement of the parallel optical package 12 and allows for the rotation and clamping of the laser insertion assembly 40. Package support frame 20 is comprised of package mount 24 which is supported at one end by front support 22 and at opposing end by actuator support 26 which is disposed generally parallel to front support 22. The top edge of front support 22 mates with front support recess 32 on the mating side of package mount 24.

Front support screws 30A and 30B are inserted through front support holes 96A and 96B of a first end of package mount 24. (See FIG. 5). As illustrated in FIG. 1, the opposing end of the package mount 24 slides into actuator support recess 34A and 34B which is disposed approximately midway along the length of actuator support 26.

Relative position of package mount 24 is maintained by inserting screws (not shown) through actuator support 26 into actuator holes 92A and 92B. (See FIG. 5).

The top face of package mount 24 includes parallel optical package recess 37 and electrical connector recess 38. Hinge recesses 29A and 29B are disposed on opposing sides of package mount 24. Hinge block 28A and 28B are installed in recess 29A and 29B, respectively, for axial insertion of hinge pins 31A and 31B.

Figure 2:
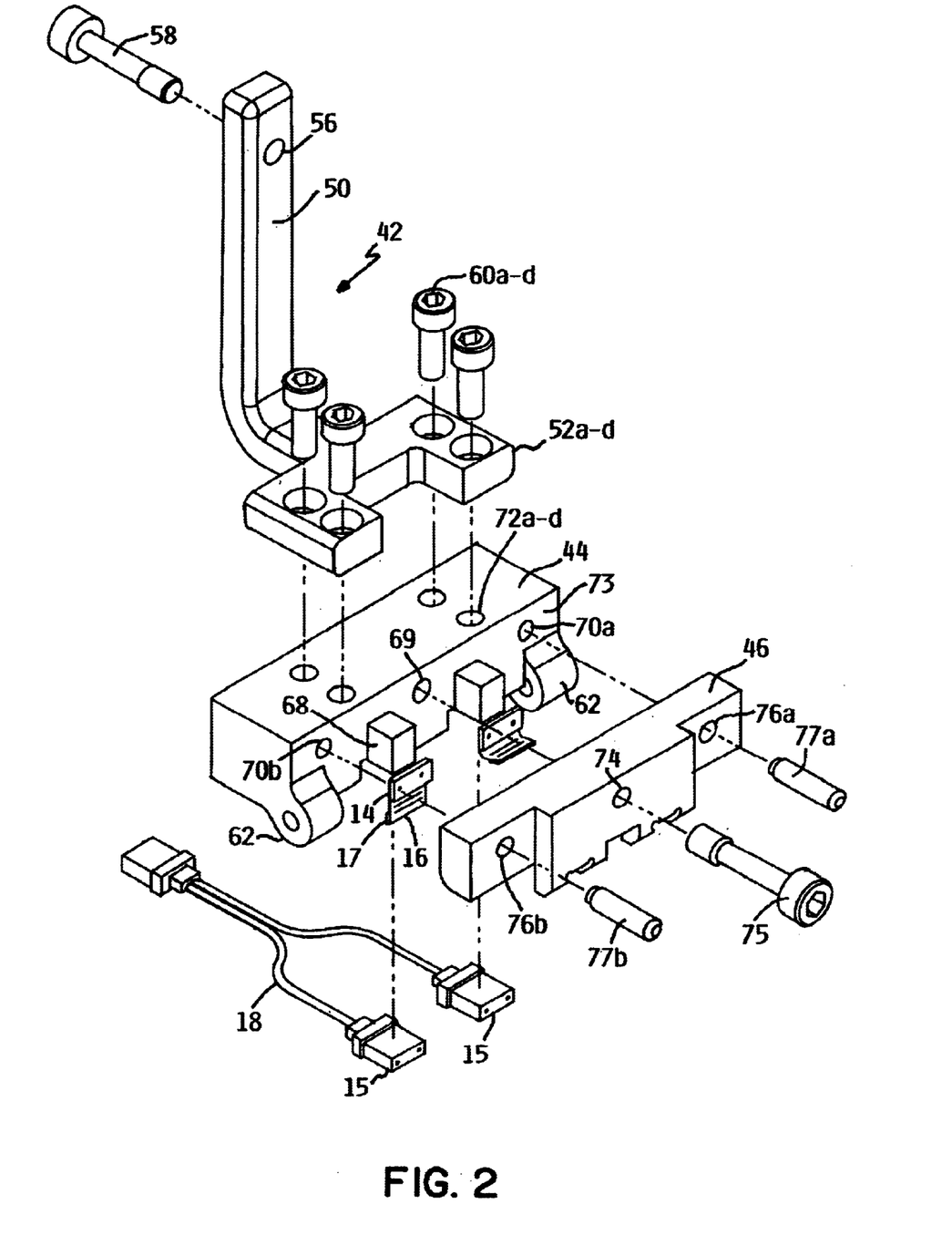
FIG. 2 is an exploded perspective view of a laser insertion assembly of the present invention in which a VCSEL and MT connector are included.

As illustrated in FIG. 2, laser insertion assembly 40 is comprised of actuator arm 42, laser support 44 and laser clamp 46. Actuator arm 42 is mounted to the upper face of laser support 44 by inserting actuator screws 60 through respective arm holes 54 which threadably engage laser support holes 72. Handle 50 of actuator arm 42 is disposed perpendicular to actuator mount 52. At the distal end of handle 50 is clamp hole 56 through which clamp screw 58 is axially inserted and to engage a matching actuator hole 98 within actuator recess 97 in actuator support 26.

Figure 3A:
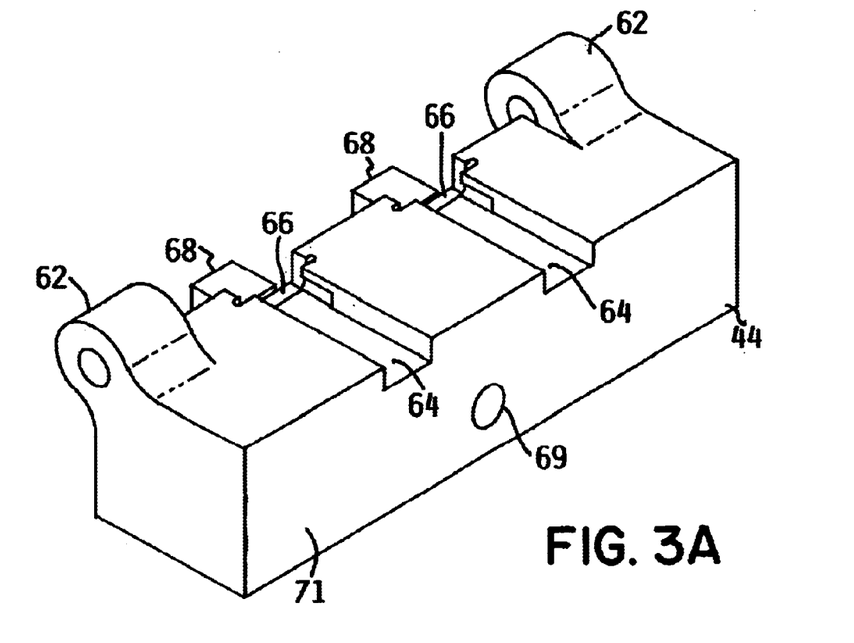
FIG. 3A is a rear perspective view of the laser support of the present invention.
Figure 3B:
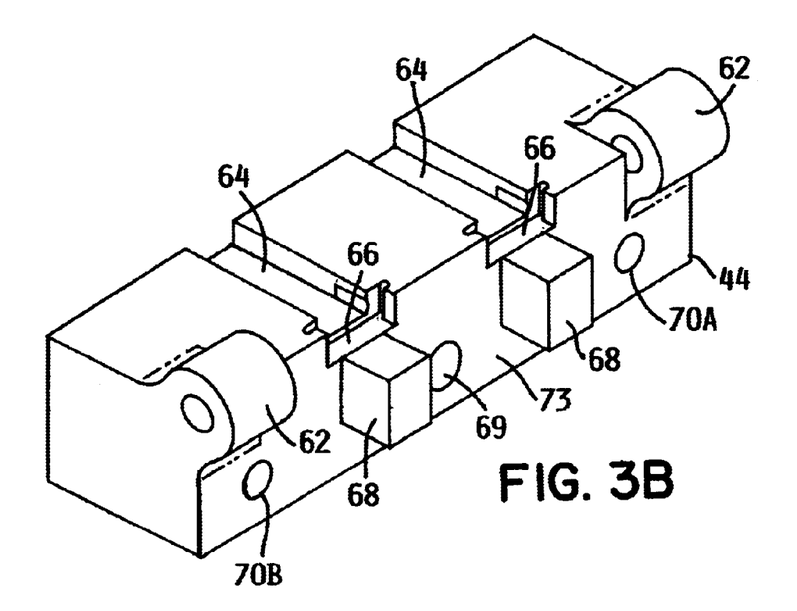
FIG. 3B is a front perspective view of the laser support of the present invention.

Laser support 44, as illustrated in FIGS. 3A and 3B, provides the receptacle for the optoelectronic device, which in a preferred embodiment is a VCSEL. VCSEL 14 with attached flexible circuit 16 and MT connector 15 is inserted into MT connector cavity 66 on the mating face of laser support 44. Fiber optic cable 18 will extend distally within cable cavity 64. MT connector 15 rests on connector support 68 with VCSEL 14 and flexible circuit 16 freely extending toward laser clamp 46. Hinge knuckles 62A and 62B are disposed on opposing sides of laser support 44 so that upon alignment with hinge blocks 28A and 28B and insertion of pins 31A and 31B, the axis of rotation runs through MT connector 15.

As illustrated by FIG. 2, laser clamp 46 mates with laser support 44 to hold the VCSEL 14 in place. Laser clamp 46 is positioned by way of inserting clamp guides 77A and 77B through laser clamp guide holes 76A and 76B which align with laser support guide holes 70A and 70B. Position is maintained by inserting clamp screw 75 through clamp screw hole 74 in the laser clamp 46 which threadably engages support clamp hole 69.

Figure 4A:
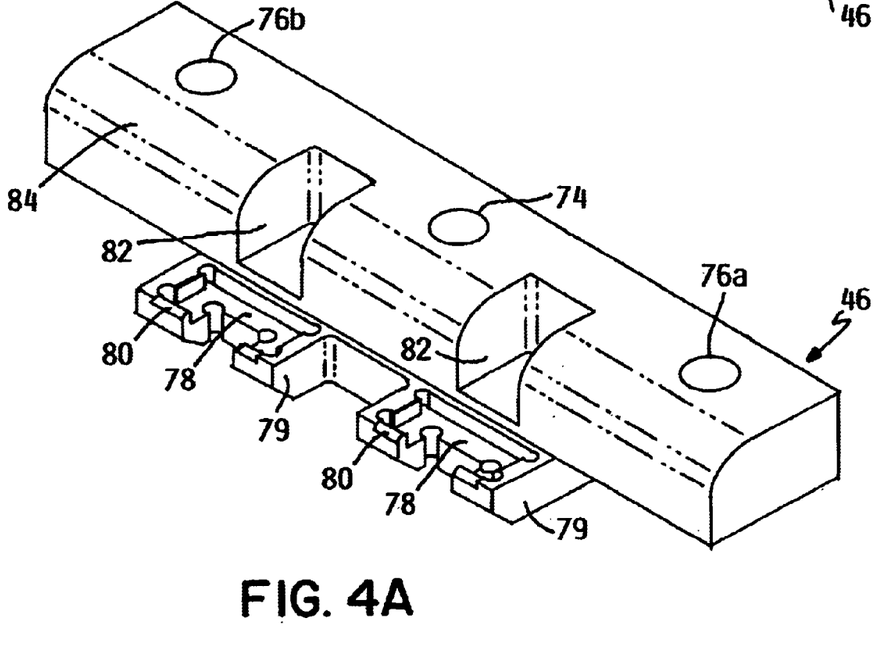
FIG. 4A is a perspective view of the mating face of the laser clamp of the present invention.
Figure 4B:
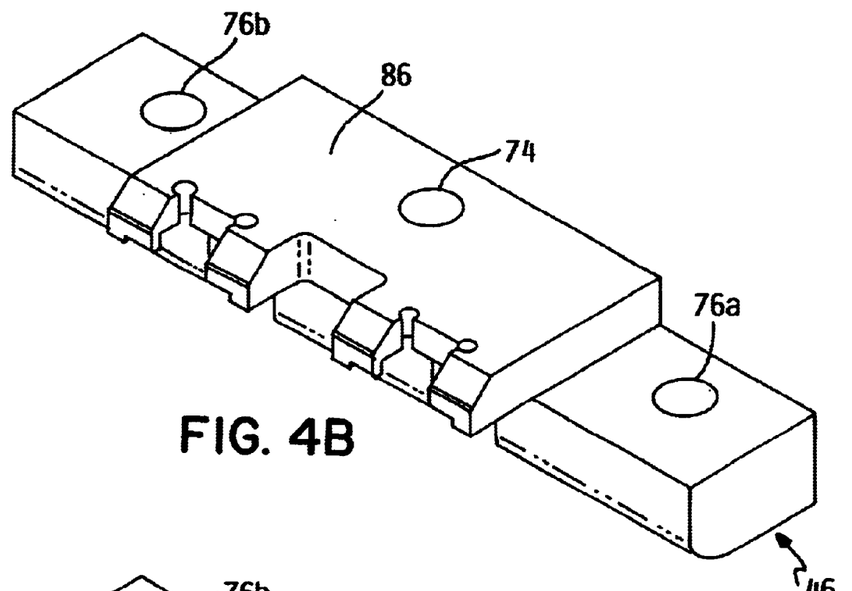
FIG. 4B is a top perspective view of the laser clamp of the present invention.

FIGS. 4a and 4b illustrate the two faces of laser clamp 46. VCSEL 14 fits within VCSEL cavity 78 located on VCSEL support 79. Flexible circuit 16 initially extends parallel to the package mount 24. As VCSEL support 79 contains a flex rotation face 80 which guides rotation of flexible circuit 16 when laser support 44 is rotated. This acts as a mandrel in forming the VCSEL. The rotation face 84 of laser clamp 46 is rounded to match flex rotation face 80, and allow free rotation of the laser clamp 86.

Figure 5:
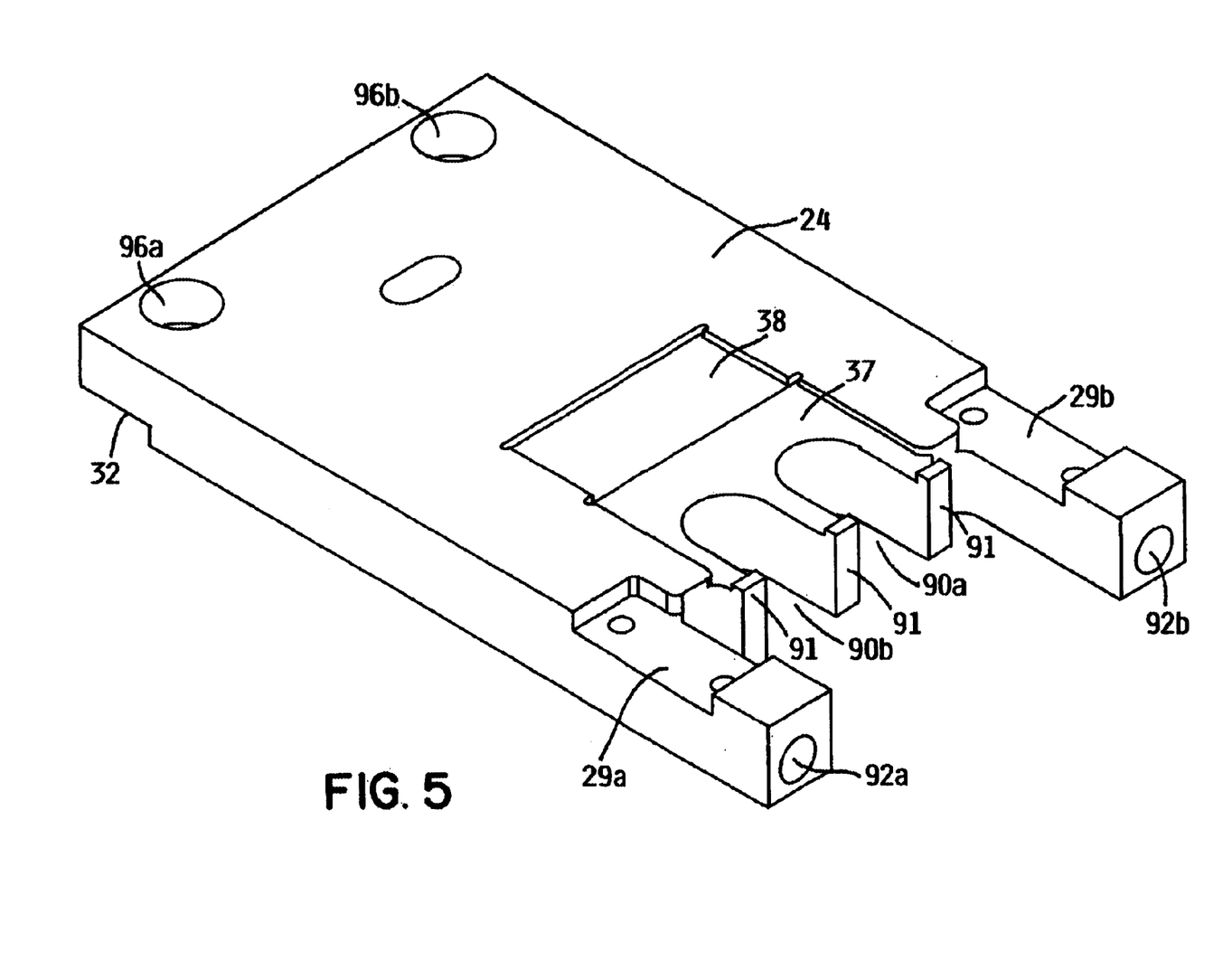
FIG. 5 is a perspective view of the package mount of the package support frame of the present invention.
Figure 6:
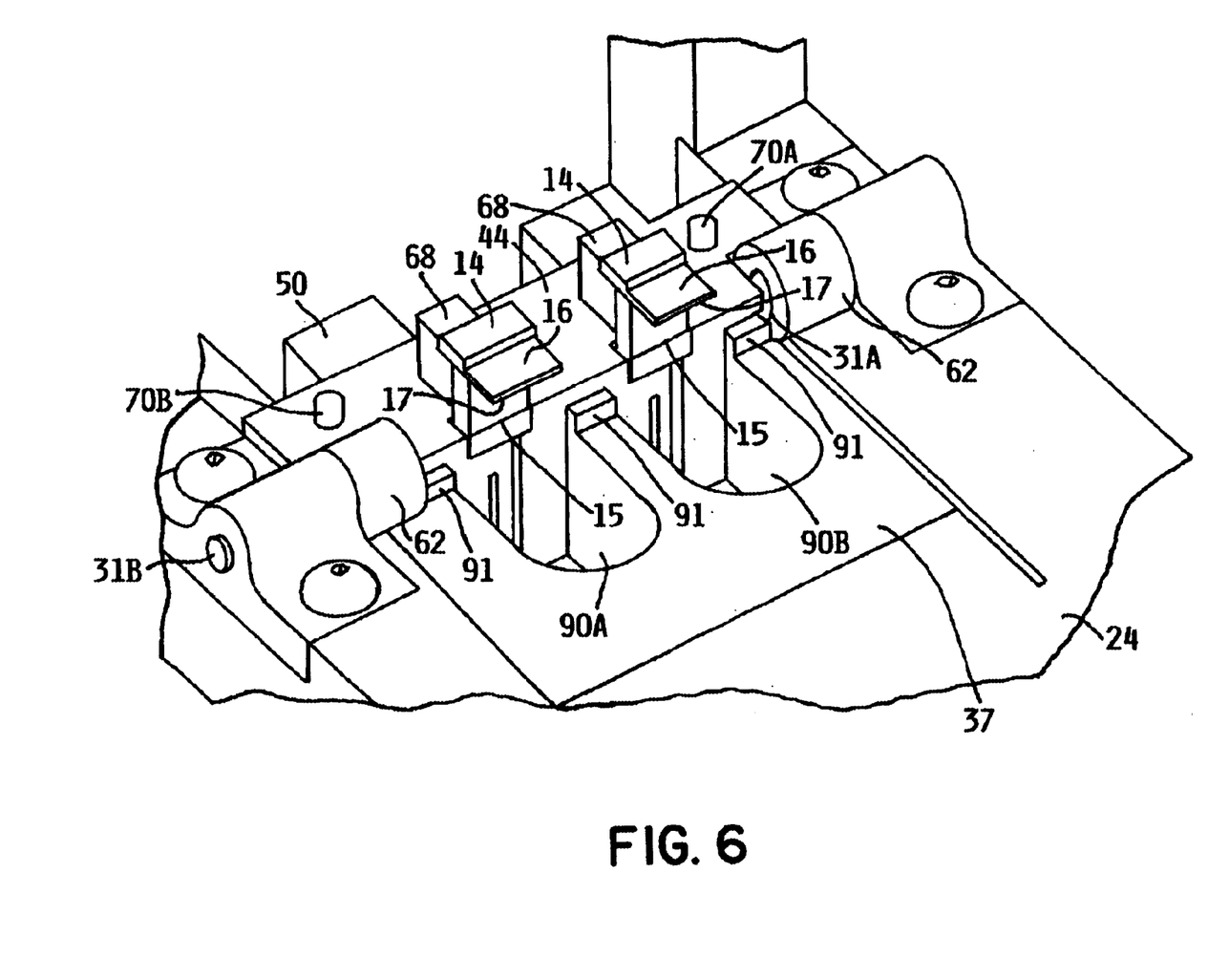
FIG. 6 is a top perspective view of the laser package integration tool with VCSEL installed prior to integration.
Figure 7:
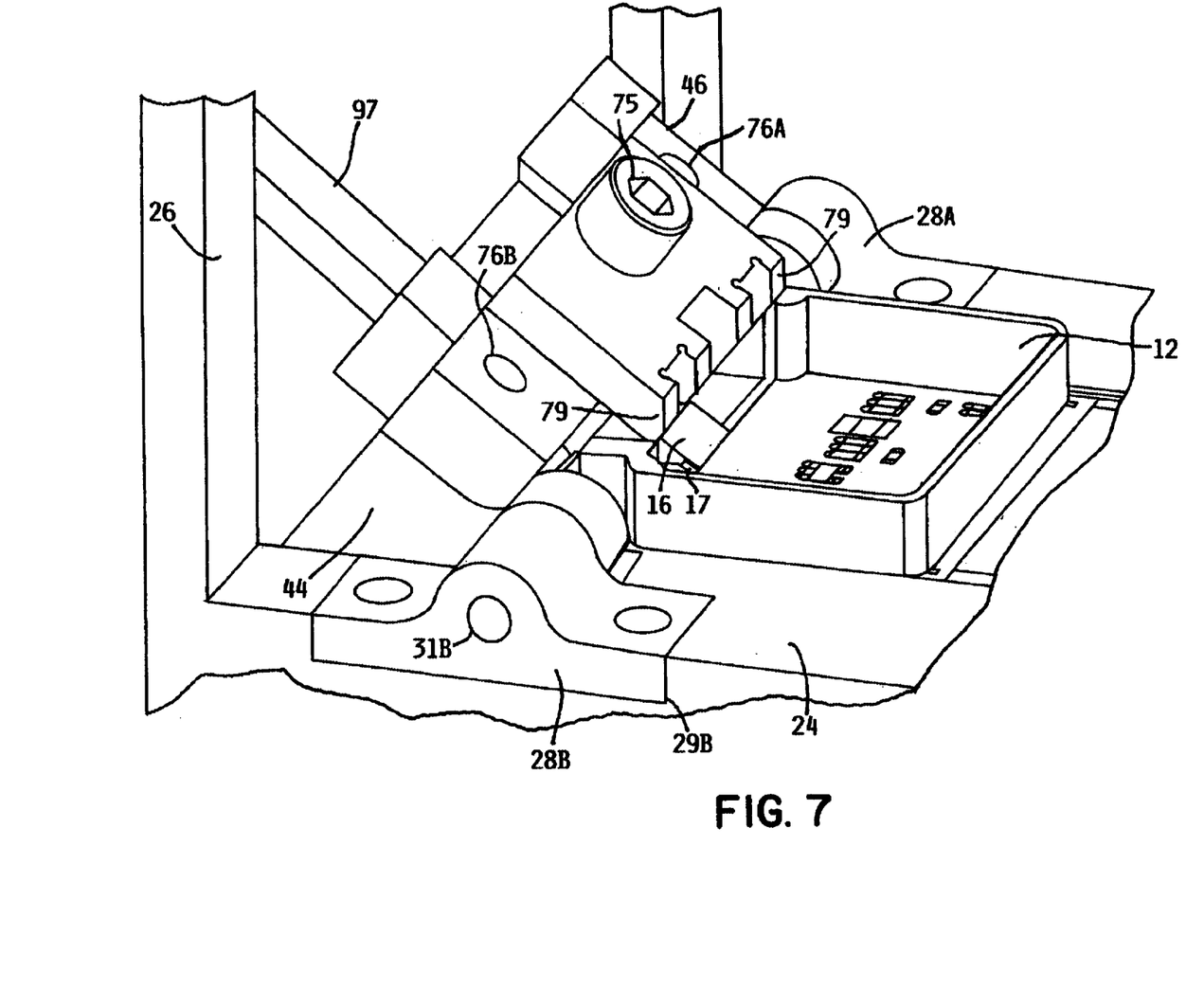
FIG. 7 is a perspective view of the laser clamp assembly during rotation.
Figure 8:
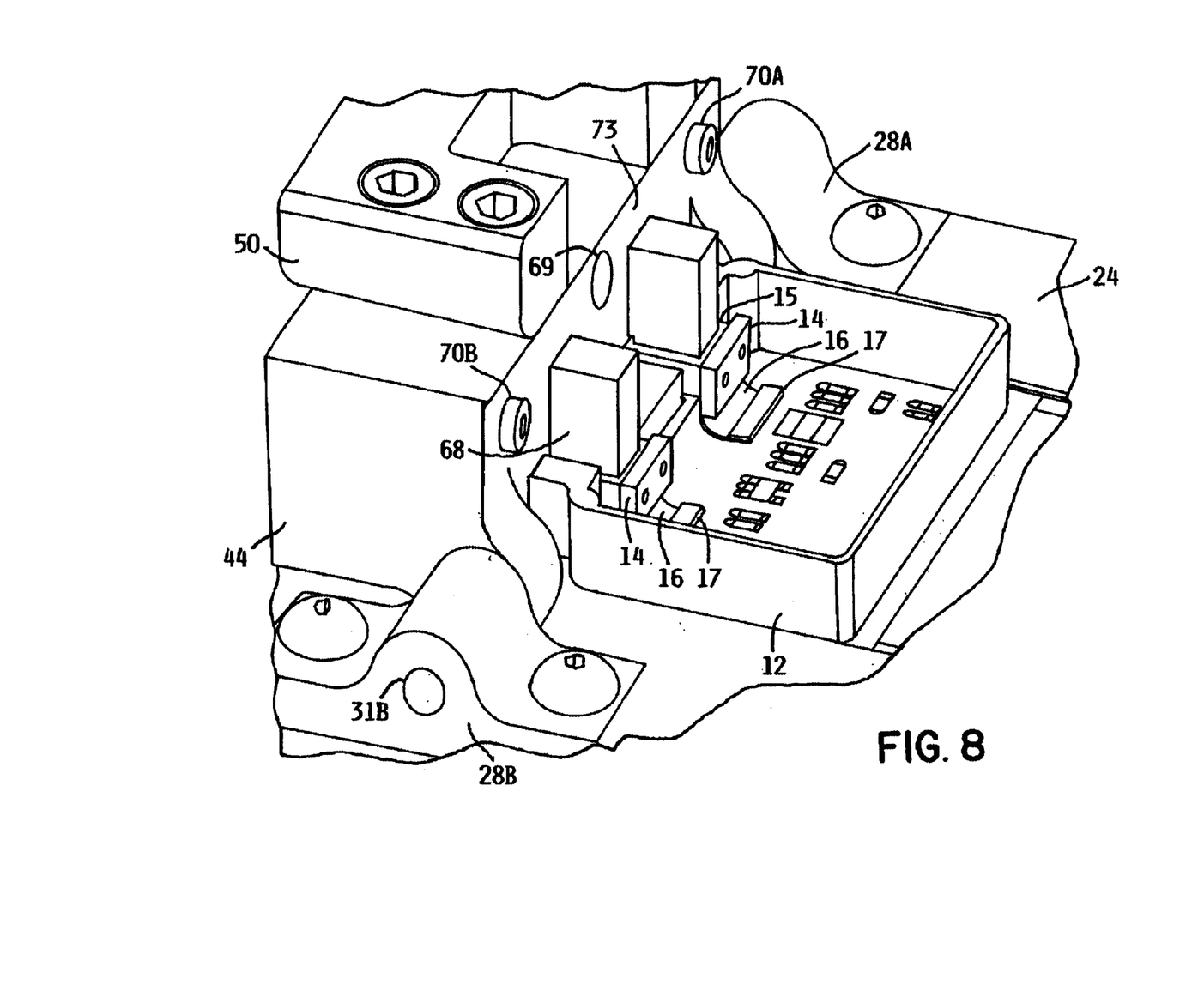
FIG. 8 is a perspective view of the laser package integration tool after rotation with laser clamp removed.

Operation of the present invention is illustrated in FIGS. 6–8. Laser support 44 is connected by pins 31A and 31B to package mount 24. Actuator arm 42 is then mounted on to the distal face of laser support 44. As illustrated in FIG. 6, laser support 44 is initially disposed with clamping face 73 extending parallel to package mount 24. MT connector 15 with VCSEL 14 and flexible circuit 16 attached are inserted into MT connector cavity 66 from the bottom of package mount 24 through recess 90A and 90B. (see FIG. 5). At this point in the integration, the flexible circuit 16 and distally mounted spacer 17 extend over the parallel optical package recess 37 on the package mount 24.

As illustrated by FIG. 7, laser clamp 46 is installed over VCSEL 14 by insertion of clamp guides 77A and 77b and engagement of clamp screw 75. Parallel optical transceiver package 12 is next disposed within recess 37 of package mount 24. As illustrated in FIG. 5, multiple package restraints 91 form a barrier for spacing parallel optical transceiver package 12 relative to laser support 44 for rotation.

To integrate the flexible circuit 16 with the parallel optical transceiver package 12, the user rotates handle 50 of actuator arm 42 approximately ninety degrees until clamp hole 56 at the distal end of handle 50 engages actuator recess 97 in actuator support 26. FIG. 7 illustrates partial rotation of laser insertion assembly 40 in which flexible circuit 16 is brought to engage the parallel optical transceiver package 12 without lateral movement. Note that FIG. 7 only includes a single flexible circuit 16 for illustrative purposes. It is envisioned that the integration would involve the simultaneous placement of two flexible circuits.

As illustrated in FIG. 1, clamp screw 58 is axially inserted and threadably engages actuator hole 98 to secure actuator arm 42 in place once the laser assembly 40 has rotated 90 degrees. As illustrated in FIG. 8, following rotation and clamping of actuator arm 42, the spacer block 17 is disposed within the appropriate recess of parallel optical transceiver package 12. Adhesive may now be applied to the integrated unit, or applied before rotation is completed.

It is to be understood that the embodiments described herein are only illustrative and modifications of the various dimensions and materials can be made still within the spirit and scope of this invention.

What is claimed is:

1. A method of connecting an optoelectronic device with an electronic interface substrate to form a parallel optical transceiver package, the optoelectronic device having an opposing blind face and an active face with a flexible circuit interposed between the active face and an optical connector, said optical connector providing the interface to a plurality of optical fibers, said method comprising the steps of:

positioning the electronic interface substrate within a package recess disposed on a package assembly tool;

positioning the optical connector into a cavity within a rotatable base of the package assembly tool, so that the attached optoelectronic device is initially disposed transverse to the electronic interface substrate;

clamping the optoelectronic device in position by securing a laser clamp to the rotatable base;

rotating the rotatable base until the optoelectronic device is aligned parallel to the electronic interface substrate with the flexible circuit providing an arcuate electrical path to the electronic interface substrate;

securing the package assembly tool in position; and bonding the flexible circuit to the electronic interface substrate.

2. The method of claim 1 wherein the flexible circuit includes a spacer block for aligning the flexible circuit with the electronic interface substrate after rotating the rotatable base.

3. The method of claim 2 wherein the spacer block is constructed of a non-conductive material.

4. The method of claim 3 wherein the spacer block is inserted within a recess in the electronic interface substrate, said recess aligned with a plurality of bond sites electrically connected to an optoelectronic driver.

5. The method of claim 1 wherein rotating the rotable base is accomplished by:

securing an actuator arm to the rotatable base; and pivoting the rotatable base by raising the actuator until it is disposed perpendicular to a starting position.

6. A package assembly tool for mating an optoelectronic device with an electronic interface substrate to form a parallel optical transceiver package, said optoelectronic device comprised of a laser optically connected to an optical connector with a secured end of a flexible electrical substrate interposed between the laser and optical connector which provides an electrical communication path for the parallel optical transceiver package, said package assembly tool comprising:

means independently securing the optoelectronic device and the electronic interface substrate;

means for rotating the optoelectronic device relative to the electronic interface substrate for integration, said means include mounts disposed at opposing ends of the package cavity and axially aligned with a pair of pin mounts on the laser clamp so that when a pair of pins are axially inserted said laser clamp is displaced from a vertical position relative to the electronic interface substrate to a horizontal position so that the free end of the flexible circuit contacts an alignment position of the electronic interface substrate; and means for maintaining the integrated position for bonding.

7. The package assembly tool of claim 6 in which the means for securing the electronic interface substrate includes a package cavity with a mounting platform aligned for integration with the optoelectronic device.

8. The package assembly tool of claim 7 in which the means for securing the optoelectronic device is a laser clamp mounted aligned with the package cavity.

9. The package assembly tool of claim 8 in which the laser clamp includes a support structure with an opening through which a free end of the flexible electrical circuit extends for integration with the electronic interface substrate.

10. The package assembly tool of claim 9 in which the laser clamp includes a rounded nose acting as a mandrel for guiding the flexible circuit during rotation of the laser clamp.

11. The package assembly tool of claim 6 in which rotation of the laser clamp is guided by mechanically displacing an actuator arm.

12. The package assembly tool of claim 11 in which a pre-integration position for the laser clamp is set by when the actuator arm rests on a lower face of a recess in an actuator frame and an integrated position occurs when the actuator arm is advanced to an actuator arm recess disposed on an upper face of the actuator frames.

13. The package assembly tool of claim 6 in which the integrated position is maintained by securing the actuator arm to the actuator frame.

* * * * *